United States Patent
Chuang

(10) Patent No.: US 9,444,290 B2
(45) Date of Patent: Sep. 13, 2016

(54) CIRCUIT FOR SIGNAL DECODING IN RFID OR WIRELESS POWER CHARGING

(71) Applicant: Generalplus Technology Inc., Hsinchu (TW)

(72) Inventor: Down Xu Chuang, Zhunan Township, Miaoli County (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 188 days.

(21) Appl. No.: 14/043,236

(22) Filed: Oct. 1, 2013

(65) Prior Publication Data

US 2014/0240099 A1 Aug. 28, 2014

(30) Foreign Application Priority Data

Feb. 27, 2013 (TW) .............................. 102106823 A

(51) Int. Cl.
*H04Q 5/22* (2006.01)
*H02J 17/00* (2006.01)
*G06K 19/07* (2006.01)

(52) U.S. Cl.
CPC ............ *H02J 17/00* (2013.01); *G06K 19/0703* (2013.01); *H02J 50/12* (2016.02)

(58) Field of Classification Search
CPC .......... H02J 17/00; H02J 50/00; H02J 50/10; H02J 50/12; G06K 19/0703
See application file for complete search history.

(56) References Cited

U.S. PATENT DOCUMENTS

| | | | |
|---|---|---|---|
| 2011/0299636 A1* | 12/2011 | Tsai | H02J 17/00 375/340 |
| 2012/0146576 A1* | 6/2012 | Partovi | H01F 7/0252 320/108 |

* cited by examiner

*Primary Examiner* — Ryan Sherwin
(74) *Attorney, Agent, or Firm* — Muncy, Geissler, Olds & Lowe, P.C.

(57) ABSTRACT

A circuit for signal decoding in RFID or wireless power charging is provided in the present invention. The implement of the present invention is to add a current sense resistor connected to an upper switch or a lower switch the up arm switch or low arm switch to decode the signal on the current sense resistor. Since the error would occur in the original voltage decoder of the wireless power or RFID when the load is heavy and voltage signal swing is large, such that the charge status and then the off-line status cyclically occur and then the charge status . . . occurs in cycle when the mobile device is charging under charge. Since the present invention uses the voltage and current for decoding at the same time, the decoding would be succeed whenever the load is light or heavy.

14 Claims, 11 Drawing Sheets

CIRCUIT FOR SIGNAL DECODING IN RFID OR WIRELESS POWER CHARGING

This application claims priority of No. 102106823 filed in Taiwan R.O.C. on Feb. 27, 2013 under 35 USC 119, the entire content of which is hereby incorporated by reference.

BACKGROUND OF THE INVENTION

1. Field of Invention

The present invention relates to the technology of Radio Frequency Identification (RFID) or wireless power transmission and feedback, and more particularly to a circuit for signal decoding in RFID or wireless power charging.

2. Related Art

Wireless charging technology is a technology for charging a device without a cord and by magnetic means. The wireless charging technology originated in the wireless power transmission, which uses magnetic resonance for transmitting charges from a charger to a device through the air, wherein the coil and the capacitor is resonated between the device and the charger, to achieve high efficient energy transmission. Wireless charging technology includes the characteristics of more safety, no expose connector, no electrical leakage, and so on. Therefore, the problems of the wired charging are prevented.

As development of the Wireless charging technology, Wireless Power Consortium is established in response to the current situation. The significance of Wireless Power Consortium is to promote Qi standard. Because of the standardization, the wireless charging standard can be efficiently promoted. In Qi standard, it mentioned that in the charge process, the signal of the L-C resonance element must be decoded to serve as the signal for controlling output power and sequence procedure. Thus, the correctness of the signal transmission is very important.

FIG. 1A illustrates a circuit diagram depicting a standard transmitter of Wireless Power Consortium in the conventional art. FIG. 1B and FIG. 1C respective illustrate circuit diagrams depicting standard receiver of Wireless Power Consortium in the conventional art. Referring to FIG. 1A, the circuit of the transmitter includes a half-bridge converter 101, a resonant circuit 102, a control circuit 103 and a decoding circuit 104. In addition, referring to FIG. 1B, the circuit of the receiver includes a coil L101, a bridge rectifier B101, a receiver capacitor C101, a rectifier capacitor C102, a modulation resistor R101, a transmission switch SW101 and a communication circuit COMM. The coupling relationship of the circuit is as shown in FIG. 1B.

The receiver can be served as a mobile device, such as a mobile phone, with a wireless power charging circuit or RFID device, such as EasyCard. When the coil L101 of the receiver receives a transmitted magnetic power, after a rectifying process, the rectified magnetic power is transmitted to an integrated circuit of a mobile device or a RFID device, the mobile device or the RFID device controls the transmission switch SW101 through the communication circuit COMM. For example, if the code to be transmitted by the communication circuit COMM is "1", the communication circuit COMM would control the transmission switch SW101 to a conduction state, and if the code to be transmitted by the communication circuit COMM is "0", the communication circuit COMM would control the transmission switch SW101 to a cut-off state.

When the transmission switch SW101 is in the conduction state, the response of the resonant circuit 102 is the reduction of quality factor. Therefore, the amplitude of the sinusoid wave of the resonant circuit 102 would be reduced. When the transmission switch SW101 is in the cut-off state, the quality factor of the resonant circuit 102 is increased. In response thereto, the amplitude of the sinusoid wave of the resonant circuit 102 is increased. The transmission method in the wireless communication is so-called Amplitude Shift Keying (ASK).

Next, referring to FIG. 1C, the circuit of the receiver also includes a coil L101, a bridge rectifier B101, a receiver capacitor C101 and a rectifier capacitor C102. The difference between the FIG. 1B and FIG. 1C is that the modulation resistor R101 is excluded from the circuit, and a first modulation capacitor C103, a second modulation capacitor C104, a first transmission switch SW102, a second transmission switch SW103 and communication circuit COMM are included in the circuit of FIG. 1C. The coupling relationship is shown as FIG. 10.

Similarly, the receiver can be served as a mobile device, such as a mobile phone, with a wireless power charging circuit or RFID device, such as EasyCard. When the coil L101 of the receiver receives a transmitted magnetic power, after a rectifying process, the rectified magnetic power is transmitted to an integrated circuit of a mobile device or a RFID device, the mobile device or the RFID device controls the first and the second transmission switches SW102 and SW103 to perform the code transmission through the communication circuit COMM. It is to be observed that the elements coupled to the transmission switches are capacitors. When the switch(s) is/are in conduction state, the resonant frequency of the resonant circuit would be shifted. Therefore, the gain of logic "0" would be different from the gain of logic "1". Because the code transmission is similar to that of the abovementioned method, the detail description is omitted.

Furthermore, the transmitter of the wireless charger or RFID circuit includes two control modes. The first control mode is frequency variation control mode. Generally speaking, the control signal for controlling the half bridge converter 101, which is outputted from the control circuit, is a particular pulse width modulation (PWM) signal. The PWM signal has a fixed duty cycle. When it is in light load, the frequency of the PWM signal is reduced. When it is in heavy load, the frequency of the PWM signal is increased. Since the system frequency is frequently varied, the quality factor thereof is varied, and the code in the normal communication would be hardly to be identified. The communication would be affected by loading, inductance, communication capacitance or the coil position.

When the load is heavy, the frequency offset results in the system frequency tends to the resonant frequency. In the mean time, performing the data transmission through the coil may cause decoding error if only one standard decoding circuit provided by Wireless Power Consortium is adopted to decode the transmission data.

The other control mode is to fix the duty cycle and frequency of the PWM signal of the half bridge converter 101 and to change the input voltage of the half bridge converter 101 according to the load. When the load is light, the input voltage is reduced. When the load is heavy, the input voltage is increased. Likewise, when the load is heavy, the data of the receiver received by the transmitter varies too large. The variation thereof exceeds the I/O limitation of the analog circuit in the decoding circuit. Therefore, the decoding error would occur if only one standard decoding circuit provided by Wireless Power Consortium is adopted to decode the transmission data.

Applicant implements the standard decoding circuit in the wireless charger and sent it to the Qi standard test. In five standard test coils, three circuits of standard test coils cannot pass the test. Moreover, Applicant uses the wireless charger with the standard decoding circuit provided by Qi to perform the experiment of the charging test for mobile device. During the experiment, when the load is heavy or the position between the mobile device and the wireless charger has coil offset, the mobile device would sequentially shows "charging state", "offline state", "charging state", "offline state" . . . and so on. Meanwhile, the mobile device would cyclically turn on and then turn off the screen.

SUMMARY OF THE INVENTION

It is therefore an objective of the present invention to provide a circuit for signal decoding in RFID or wireless power charging to prevent the decoding error at light load or heavy load.

Another objective of the present invention is to provide a circuit for signal decoding in RFID or wireless power charging, so that the decoding can be successful even in harsh situation.

To achieve the above-identified or other objectives, the present invention provides a circuit for signal decoding in RFID or wireless power charging. The circuit for signal decoding in RFID or wireless power charging includes an upper switch, a lower switch, an L-C resonant circuit, a voltage decoding circuit, a current decoding circuit and a control circuit. The upper switch includes a first terminal, a second terminal and a control terminal, wherein the first terminal of the upper switch is coupled to the power voltage. The lower switch includes a first terminal, a second terminal and a control terminal, wherein the first terminal of the lower switch is coupled to the second terminal of the upper switch, and the second terminal of the lower switch is coupled to the common voltage.

The L-C resonant circuit includes a first terminal, a second terminal and a resonant decoding terminal, wherein the first terminal of the L-C resonant circuit is coupled to the second terminal of the upper switch and the first terminal of the lower switch, and the second terminal of the L-C resonant circuit is coupled to the common voltage. The voltage decoding circuit 204 is coupled to the resonant decoding terminal of the L-C resonant circuit, for decoding a signal of the resonant decoding terminal to obtain a first feedback data according to a variation of amplitude of the signal of the resonant decoding terminal. The current decoding circuit is coupled between the second terminal of the lower switch and the common voltage, for decoding a current variation of the lower switch to obtain a second feedback data according to the current variation of the lower switch. The control circuit is coupled to the control terminal of the upper switch, the control terminal of the lower switch, the voltage decoding circuit and the current decoding circuit, for decoding the first feedback data and the second feedback data to check whether a check code of the first feedback data is conformed to a specification and whether a check code of the second feedback data is conformed to the specification, wherein the control circuit acquires one of the first feedback data and the second feedback data which is conformed to the specification to serve as a reference for controlling the upper switch and the lower switch.

When the load is heavy such that the first feedback data decoded by the voltage decoding circuit is incorrect, wherein the control circuit confirms that the check code of the first feedback data is incorrect, the control circuit confirms that the check code of the second feedback data is correct to prevent an electrical disconnection with an outside circuit. When the load is light such that the second feedback data decoded by the current decoding circuit is incorrect, wherein the control circuit confirms that the check code of the second feedback data is incorrect, the control circuit confirms that the check code of the first feedback data is correct to prevent the electrical disconnection with the outside circuit.

The present invention further provides a circuit for signal decoding in RFID or wireless power charging. The circuit for signal decoding in RFID or wireless power charging includes an upper switch, a lower switch, an L-C resonant circuit, a voltage decoding circuit, a current decoding circuit and a control circuit 206. The upper switch includes a first terminal, a second terminal and a control terminal, wherein the first terminal of the upper switch is coupled to the power voltage. The lower switch includes a first terminal, a second terminal and a control terminal, wherein the first terminal of the lower switch is coupled to the second terminal of the upper switch, and the second terminal of the lower switch is coupled to the common voltage.

The L-C resonant circuit includes a first terminal, a second terminal and a resonant decoding terminal, wherein the first terminal of the L-C resonant circuit is coupled to the second terminal of the upper switch and the first terminal of the lower switch, and the second terminal of the L-C resonant circuit is coupled to the common voltage. The voltage decoding circuit 204 is coupled to the resonant decoding terminal of the L-C resonant circuit, for decoding a signal of the resonant decoding terminal to obtain a first feedback data according to a variation of amplitude of the signal of the resonant decoding terminal. The current decoding circuit is coupled between the first terminal of the upper switch and the common voltage, for decoding a current variation of the lower switch to obtain a second feedback data according to the current variation of the lower switch. The control circuit is coupled to the control terminal of the upper switch, the control terminal of the lower switch, the voltage decoding circuit and the current decoding circuit, for decoding the first feedback data and the second feedback data to check whether a check code of the first feedback data is conformed to a specification and whether a check code of the second feedback data conform is conformed to the specification, wherein the control circuit acquires one of the first feedback data and the second feedback data which is conformed to the specification to serve as a reference for controlling the upper switch and the lower switch.

When the load is heavy such that the first feedback data decoded by the voltage decoding circuit is incorrect, wherein the control circuit confirms that the check code of the first feedback data is incorrect, the control circuit confirms that the check code of the second feedback data is correct to prevent an electrical disconnection with the outside circuit. When the load is light such that the second feedback data decoded by the current decoding circuit is incorrect, wherein the control circuit confirms that the check code of the second feedback data is incorrect, the control circuit confirms that the check code of the first feedback data is correct to prevent the electrical disconnection with the outside circuit.

The circuit for signal decoding in RFID or wireless power charging according to the preferred embodiment of the present invention, the voltage decoding circuit includes a peak detector, an isolation capacitor, a DC bias circuit, a buffer circuit, an amplifier, a first filter circuit, a second filter circuit and a comparator. The peak detector includes an input terminal and an output terminal, wherein the input terminal of the peak detector is coupled to the second terminal of the primary coil. The isolation capacitor includes a first terminal and a second terminal, wherein the first terminal of the isolation capacitor is coupled to the output terminal of the peak detector. The DC bias circuit is coupled to the second terminal of the isolation circuit, for providing a DC bias to a signal of the second terminal of the isolation capacitor.

The buffer circuit includes an input terminal and an output terminal, wherein the input terminal of the buffer circuit is coupled to the second terminal of the isolation capacitor. The amplifier includes an input terminal and an output terminal, wherein the input terminal of the amplifier is coupled to the output terminal of the buffer circuit, for amplifying a signal of the output terminal of the buffer circuit. The first filter circuit includes an input terminal and an output terminal, wherein the input terminal of the first filter circuit is coupled to the output terminal of the amplifier. The second filter circuit includes an input terminal and an output terminal, wherein the input terminal of the second filter circuit is coupled to the output terminal of the first filter circuit for filtering a signal of the output terminal of the first filter circuit to obtain a DC signal. The comparator includes a first input terminal, a second input terminal and an output terminal, wherein the first input terminal of the comparator is coupled to the output terminal of the first filter circuit, the second input terminal of the comparator is coupled to the output terminal of the second filter circuit, and the output terminal of the comparator is coupled to the control circuit, The comparator is used for comparing a signal outputted from the output terminal of the first filter circuit with the DC signal outputted from the output terminal of the second filter circuit, and output the first feedback data according to a difference between the signal outputted from the output terminal of the first filter circuit and the DC signal outputted from the output terminal of the second filter circuit.

The circuit for signal decoding in RFID or wireless power charging according to the preferred embodiment of the present invention, the current decoding circuit includes a current sensing resistor, a first stage amplifier and a strong current decoding circuit. The current sensing resistor includes a first terminal and a second terminal, wherein the first terminal of the current sensing resistor is coupled to the second terminal of the lower switch, and the second terminal of the current sensing resistor is coupled to the common voltage. The first stage amplifier includes an input terminal and an output terminal, wherein the input terminal of the first stage amplifier is coupled to the first terminal of the current sensing resistor for amplifying a current sensing signal of the first terminal of the current sensing resistor. In the other preferred embodiment, the first terminal of the current sensing resistor is coupled to the first terminal of the upper switch, and the second terminal of the current sensing resistor is coupled to the power voltage.

The strong current decoding circuit includes a first filter, a second filter, and a first comparator. The first filter includes an input terminal and an output terminal, wherein the input terminal of the first filter is coupled to the output terminal of the first stage amplifier, for filtering a noise of a signal outputted from the output terminal of the first stage amplifier. The second filter includes an input terminal and an output terminal, wherein the input terminal of the second filter is coupled to the output terminal of the first stage amplifier, for filtering the signal outputted from the output terminal of the first stage amplifier to output a first DC voltage. The first comparator includes a first input terminal, a second input terminal and an output terminal, wherein the first input terminal of the first comparator is coupled to the output terminal of the first filter, the second input terminal of the first comparator is coupled to the output terminal of the second filter, and the output terminal of the first comparator outputs the second feedback data according to a comparison result between a signal inputted from the first input terminal of the first comparator and a signal inputted from the second input terminal of the first comparator.

The circuit for signal decoding in RFID or wireless power charging according to the preferred embodiment of the present invention, the current decoding circuit further includes a weak current decoding circuit, the weak current decoding circuit includes a second stage amplifier, a third filter, a fourth filter and a second comparator. The second stage amplifier includes an input terminal and an output terminal, wherein the input terminal of the second stage amplifier is coupled to the output terminal of the first stage amplifier, for amplifying the signal outputted from the output terminal of the first stage amplifier. The third filter includes an input terminal and an output terminal, wherein the input terminal of the third filter is coupled to the output terminal of the second stage amplifier, for filtering a noise of a signal outputted from the output terminal of the second stage amplifier. The fourth filter includes an input terminal and an output terminal, wherein the input terminal of the fourth filter is coupled to the output terminal of the second stage amplifier, for filtering the signal outputted from the output terminal of the second stage amplifier to output a second DC voltage.

The second comparator includes a first input terminal, a second input terminal and an output terminal, wherein the first input terminal of the second comparator is coupled to the output terminal of the third filter, the second input terminal of the second comparator is coupled to the output terminal of the fourth comparator, and the output terminal of the second comparator outputs a third feedback data according to a comparison result between a signal inputted from the first input terminal of the second comparator and a signal inputted from the second input terminal of the second comparator. The control circuit is coupled to the output terminal of the second comparator for checking whether a check code of the third feedback data is conformed to the specification, and the control circuit acquires one of the first feedback data, the second feedback data and the third feedback data which is conformed to the specification to serve as the reference for controlling the upper switch and the lower switch.

The circuit for signal decoding in RFID or wireless power charging according to the preferred embodiment of the present invention, the circuit for signal decoding in RFID or wireless power charging further includes a second upper switch and a second lower switch. The second upper switch includes a first terminal, a second terminal and a control terminal, wherein the first terminal of the second upper switch is coupled to the power voltage, and the control terminal of the second upper switch is coupled to the control circuit. The second lower switch, comprising a first terminal, a second terminal and a control terminal, wherein the first terminal of the lower switch is coupled to the second terminal of the second upper switch, the control terminal of the second lower switch is coupled to the control circuit, and the second terminal of the second lower switch is coupled to the common voltage. The second terminal of the L-C resonant circuit is coupled to the common voltage through the second lower switch, wherein the first terminal of the second lower switch is coupled to the second terminal of the L-C resonant circuit. The received signal of the control terminal of the upper switch and a received signal of the control terminal of the second lower switch have a same phase, and a received signal of the control terminal of the lower switch and a received signal of the control terminal of the second upper switch have a same phase. In other words, the implementation of the circuit for signal decoding in RFID or wireless power charging can uses the full bridge topology.

The spirit of the present invention is to add a current sense resistor connected to the upper switch or lower switch to decode the signal on the current sense resistor. Since the error would occur in the original voltage decoder of the wireless power or RFID when the load is heavy, the mobile device would sequentially shows "charging state", "offline state", "charging state", "offline state" . . . and so on when the mobile device is under charge. Since the present invention uses the voltage and current for decoding at the same time, the decoding would be succeed whenever the load is light or heavy.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

First Embodiment

Figure 1A:
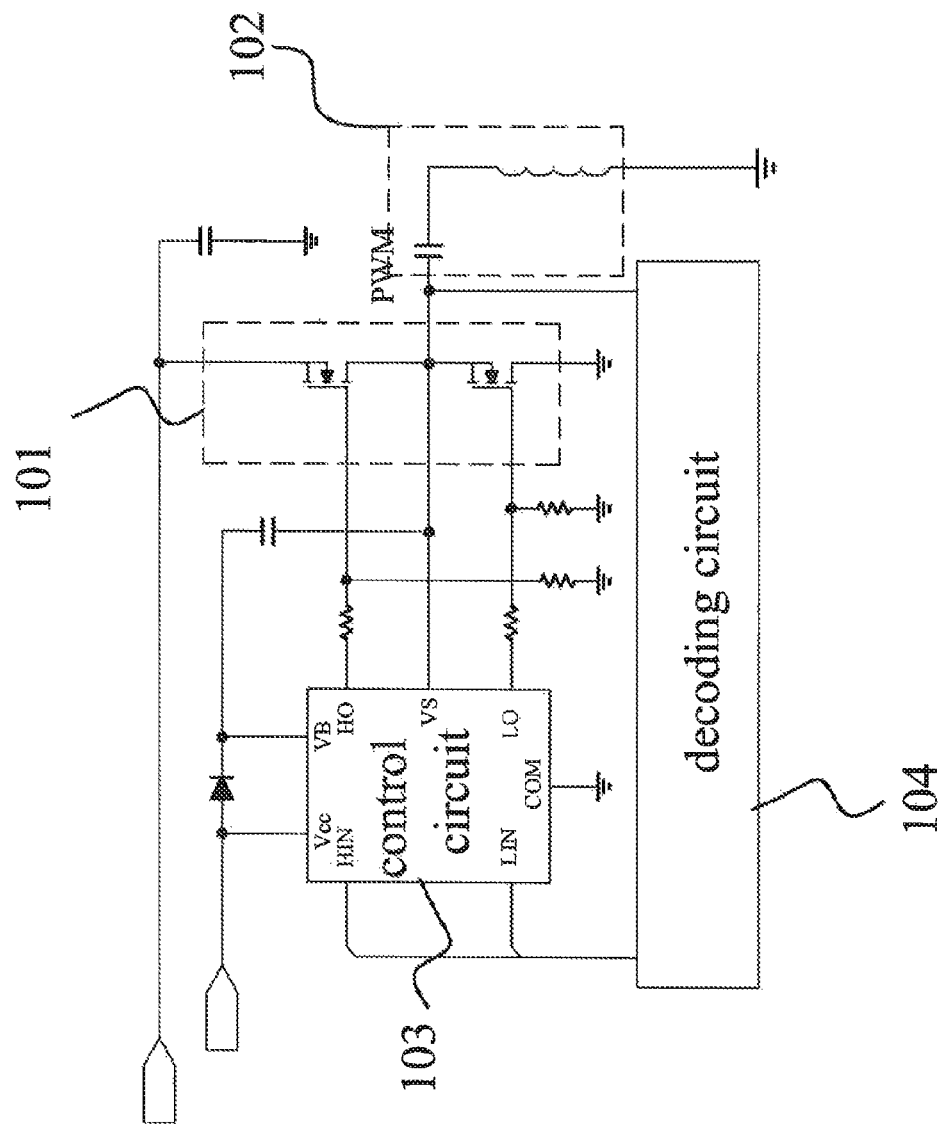
FIG. 1A illustrates a circuit diagram depicting a standard transmitter of Wireless Power Consortium in the conventional art.
Figure 1B:
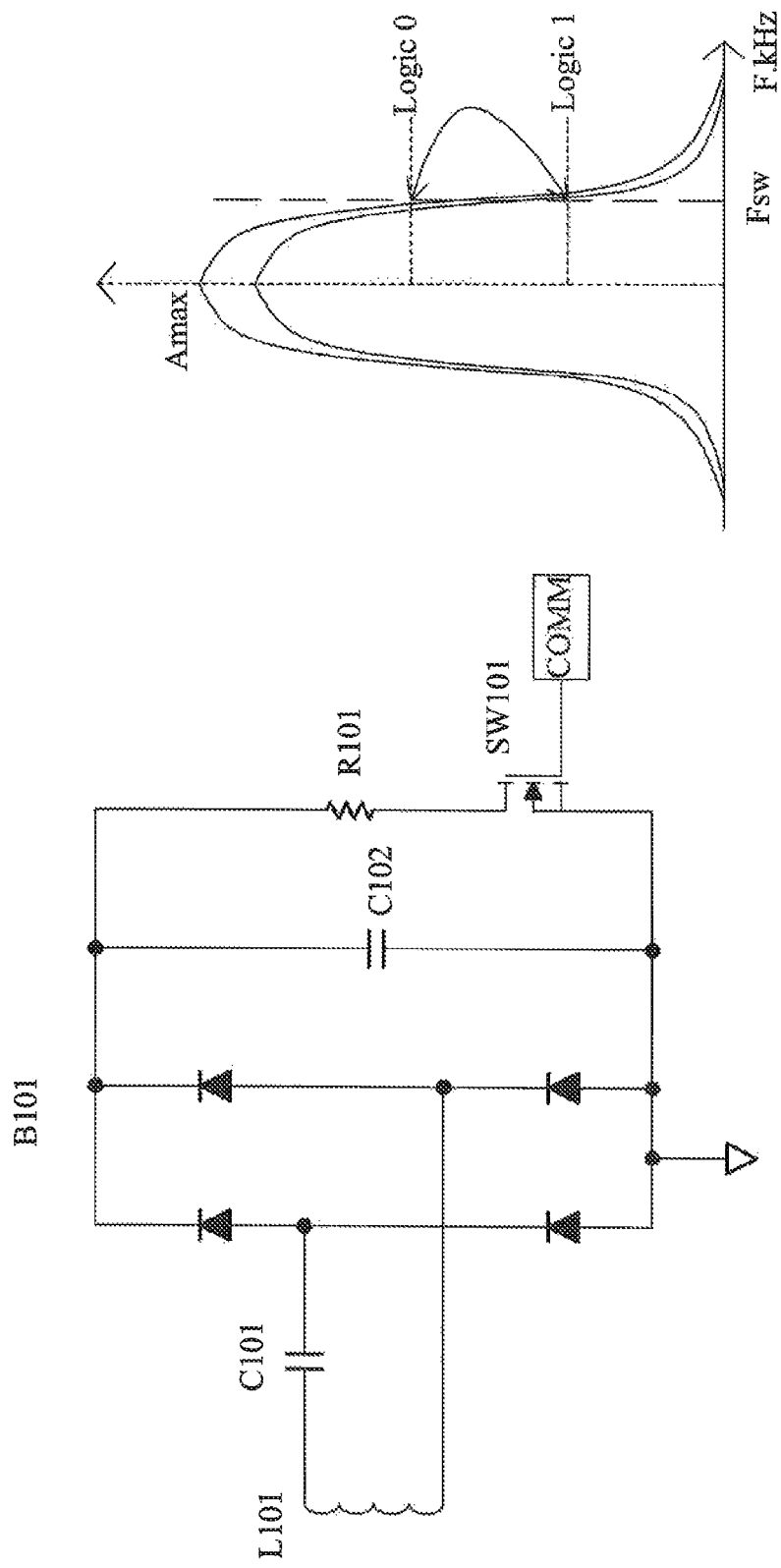
FIG. 1B illustrates circuit diagrams depicting standard receiver of Wireless Power Consortium in the conventional art.
Figure 1C:
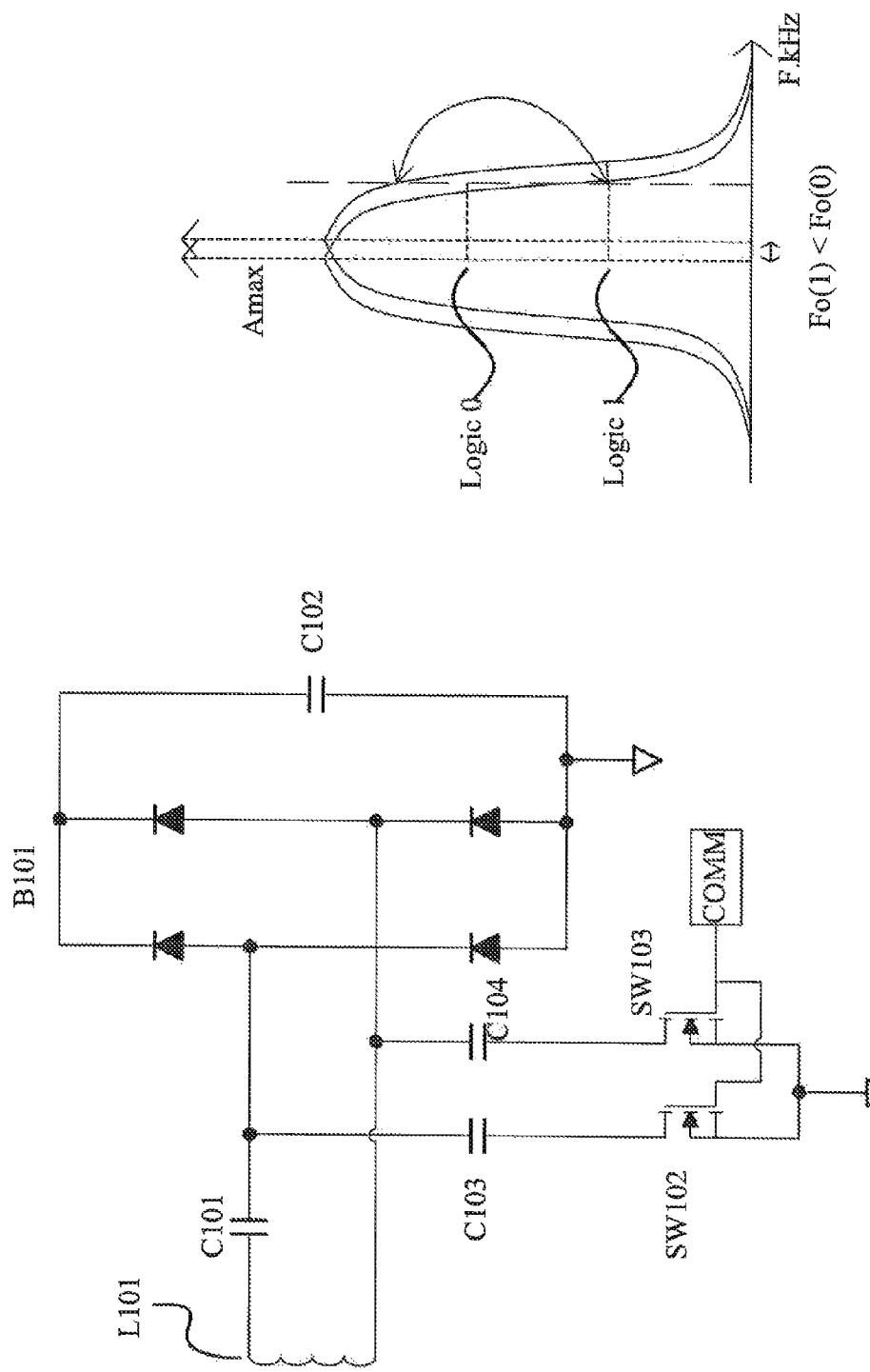
FIG. 1C illustrates circuit diagrams depicting standard receiver of Wireless Power Consortium in the conventional art.
Figure 2:
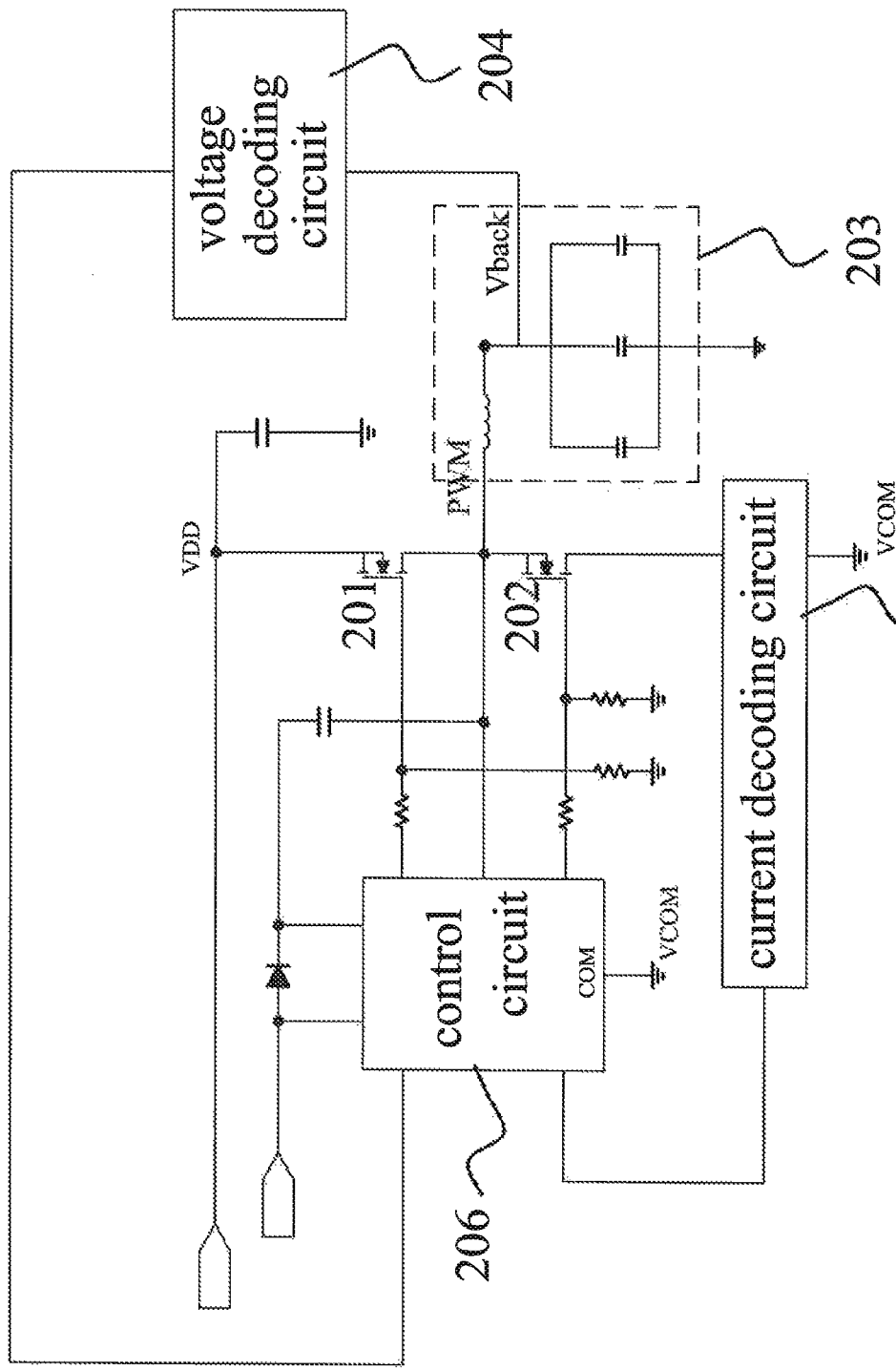
FIG. 2 illustrates a circuit block diagram depicting a circuit for signal decoding in RFID or wireless power charging according to a preferred embodiment of the present invention.

FIG. 2 illustrates a circuit block diagram depicting a circuit for signal decoding in RFID or wireless power charging according to a preferred embodiment of the present invention. Referring to FIG. 2, the circuit for signal decoding in RFID or wireless power charging includes an upper switch 201, a lower switch 202, an L-C resonant circuit 203, a voltage decoding circuit 204, a current decoding circuit 205 and a control circuit 206.

The upper switch 201 includes a first terminal, a second terminal and a control terminal, wherein the first terminal of the upper switch 201 is coupled to the power voltage VDD. The lower switch 202 includes a first terminal, a second terminal and a control terminal, wherein the first terminal of the lower switch 202 is coupled to the second terminal of the upper switch 201, and the second terminal of the lower switch 202 is coupled to the common voltage VCOM. The L-C resonant circuit 203 includes a first terminal, a second terminal and a resonant decoding terminal Vback, wherein the first terminal of the L-C resonant circuit 203 is coupled to the second terminal of the upper switch 201 and the first terminal of the lower switch 202, and the second terminal of the L-C resonant circuit 203 is coupled to the common voltage VCOM. The voltage decoding circuit 204 is coupled to the resonant decoding terminal Vback of the L-C resonant circuit 203. The current decoding circuit 205 is coupled between the second terminal of the lower switch 202 and the common voltage VCOM. The control circuit 206 is coupled to the control terminal of the upper switch 201, the control terminal of the lower switch 202, the voltage decoding circuit 204 and the current decoding circuit 205.

People having ordinary skill would know that the inductive voltage of the coil of transmitter would decrease when the receiver transmits data, such as logic "1". The voltage decoding circuit 204 decodes the signal according to the variation of the amplitude of the resonant decoding terminal Vback to obtain a first feedback data. In addition, an extra current decoding circuit 205 is provided in the present embodiment. The current decoding circuit 205 is coupled between the second terminal of the lower switch 202 and the common voltage VCOM. The inductive voltage of the coil of transmitter would decrease when the receiver transmits data, such as logic "1". In this situation, the current flowing through the lower switch 202 would decrease thereto. Thus, the current decoding circuit 205 can decode the current signal to obtain a second feedback data according to the variation of the current flowing through the lower switch 202.

Since the voltage signal swing is large when the load is heavy, the voltage decoding circuit 204 cannot decode the data from the voltage signal. The current decoding circuit 205 can be effective in this situation. Since the current flowing through the lower switch 202 is large, in order to detect the current thereof, a current sensing resistor coupled between the lower switch 202 and the common voltage VCOM is adopted in general. Moreover, for the efficiency of the circuit, the resistance value of the current sensing resistor cannot be chosen the large one. Generally, the resistance value of the current sensing resistor may be chosen 0.2 Ohm. Thus, the swing of the current sensing signal would be very small. The reason why the voltage decoding circuit 204 cannot successfully decode is that the swing of the signal is so large that the analog circuit in the voltage decoding circuit 204 operates in saturation mode. In this embodiment, the current sensing signal with a smaller swing is adopted to perform the current decoding, and it compensates the drawback of the voltage decoding. Therefore, the circuit can operate at heavy load. Thus, the circuit can be also adapted for the high power transmission instead of the original low power transmission.

According to the circuit for signal decoding in RFID or wireless power charging of the present embodiment, people having ordinary skill in the art would know that the half-bridge is adopted in this embodiment. Moreover, the present embodiment adopts the voltage decoding and the current decoding at the same time. Also, the current decoding samples the current of the lower switch 202. However, the current of the upper switch 201 also can be used for decoding. As such, another circuit for signal decoding in RFID or wireless power charging is provided in the following paragraph such that the people having ordinary skill can understand the present invention.

Figure 3:
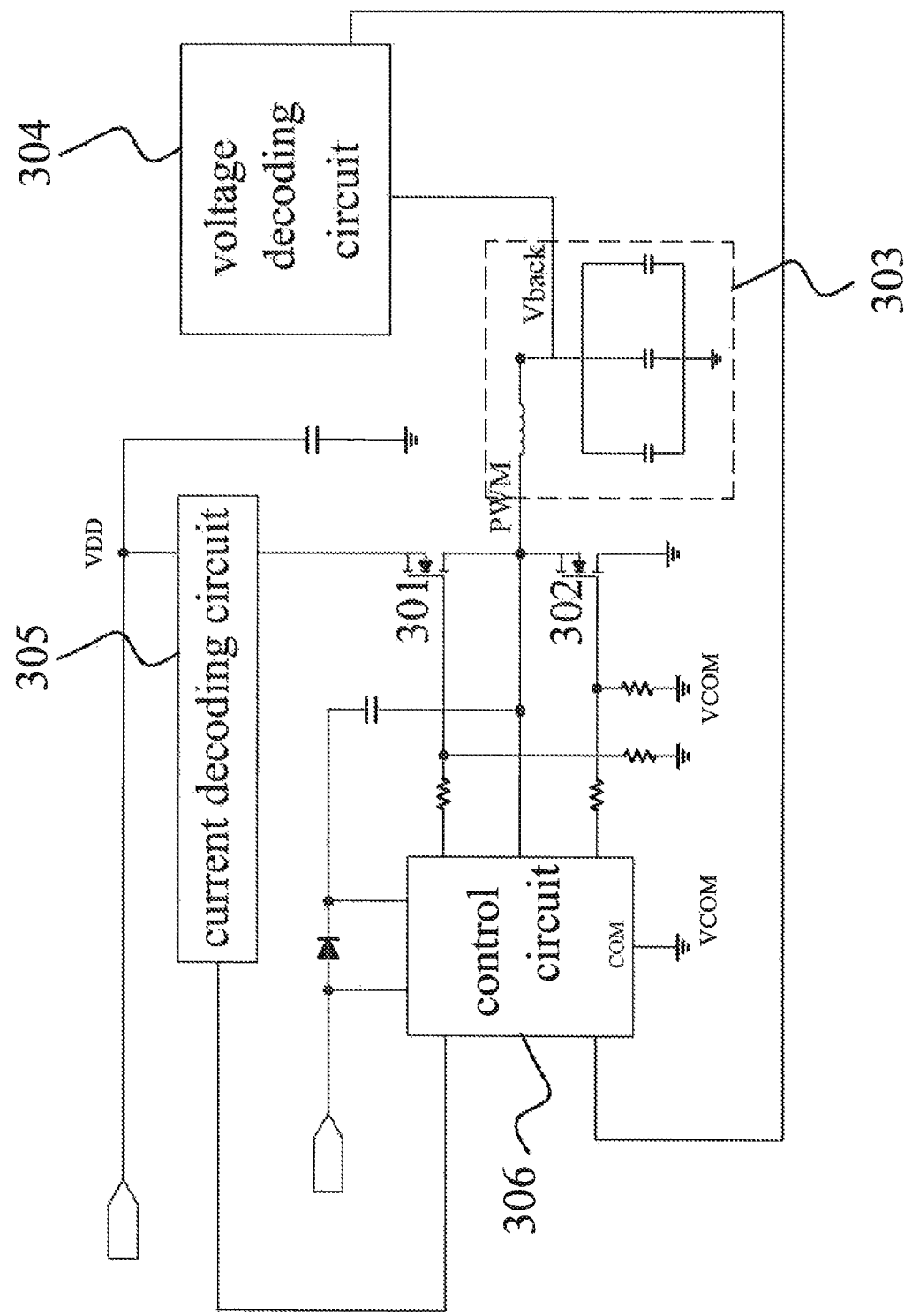
FIG. 3 illustrates a circuit block diagram depicting a circuit for signal decoding in RFID or wireless power charging according to a preferred embodiment of the present invention.

FIG. 3 illustrates a circuit block diagram depicting a circuit for signal decoding in RFID or wireless power charging according to a preferred embodiment of the present invention. Referring to FIG. 3, the circuit for signal decoding in RFID or wireless power charging includes an upper switch 301, a lower switch 302, an L-C resonant circuit 303, a voltage decoding circuit 304, a current decoding circuit 305 and a control circuit 306.

The upper switch 301 includes a first terminal, a second terminal and a control terminal, wherein the first terminal is coupled to the power voltage VDD through the current decoding circuit 305. The lower switch 302 includes a first terminal, a second terminal and a control terminal, wherein the first terminal of the lower switch 302 is coupled to the second terminal of the upper switch 301, and the second terminal of the lower switch 302 is coupled to the common voltage VCOM. The L-C resonant circuit 303 includes a first terminal, a second terminal and a resonant decoding terminal Vback, wherein the first terminal of the L-C resonant circuit 303 is coupled to the second terminal of the upper switch 301 and the first terminal of the lower switch 302, and the second terminal of the L-C resonant circuit is coupled to the common voltage VCOM. The voltage decoding circuit 304 is coupled to the resonant decoding terminal Vback of the L-C resonant circuit 303. The current decoding circuit 305 is coupled between the first terminal of the upper switch 301 and the power voltage VDD. The control circuit 306 is coupled to the control terminal of the upper switch 301, the control terminal of the lower switch 302, the voltage decoding circuit 304 and the current decoding circuit 305.

Likewise, the inductive voltage of the coil of transmitter would decrease when the receiver transmits data, such as logic "1". The voltage decoding circuit 304 decodes the signal according to the variation of the amplitude of the resonant decoding terminal Vback of the L-C resonant circuit 304 to obtain a first feedback data. In addition, an extra current decoding circuit 305 is provided in the present embodiment. The current decoding circuit 305 is coupled between the first terminal of the upper switch 301 and the power voltage VDD. Similarly, the inductive voltage of the coil of transmitter would decrease when the receiver transmits data, such as logic "1". In this situation, the current flowing through the upper switch 301 would decrease thereto. Thus, the current decoding circuit 305 can decode the current signal to obtain a second feedback data according to the variation of the current flowing through the upper switch 301.

Since the voltage signal swing is large when the load is heavy, the voltage decoding circuit 304 cannot decode the data from the voltage signal. The current decoding circuit 305 can be effective in this situation. Since the current flowing through the upper switch 301 is large, in order to detect the current thereof, a current sensing resistor coupled between the upper switch 301 and the power voltage VDD is adopted in general. Moreover, for the efficiency of the circuit, the resistance value of the current sensing resistor cannot be chosen the large one. Generally, the resistance value of the current sensing resistor may be chosen 0.2 Ohm. Thus, the swing of the current sensing signal would be very small. The reason why the voltage decoding circuit 304 cannot successfully decode is that the swing of the signal is so large that the analog circuit in the voltage decoding circuit 204 operates in saturation mode. In this embodiment, the current sensing signal with a smaller swing is adopted to perform the current decoding, and it compensates the drawback of the voltage decoding. Therefore, the circuit can operate at heavy load. Thus, the circuit can be also adapted for the high power transmission instead of the original low power transmission.

In the embodiments of FIG. 2 and FIG. 3, the L-C resonant circuit 203 and the L-C resonant circuit 303 are implemented by an inductor and three resonant capacitors. But people having ordinary skill in the art should know that the L-C resonant circuit can be implemented as the resonant circuit 102 in the prior art. The detail description is omitted.

Wireless Power Consortium already defined the control method of the wireless power charger. However, the control method would cause to continuously change the system operation frequency, and thus the quality factor of the resonance is changed as the frequency. The operation frequency in light load is different from the operation frequency in heavy load, and it causes the quality factor increased/decreased, such that the code in the normal communication would be identified with difficulty. Furthermore, the communication would be affected by loading, inductance, communication capacitance or the coil position. For example, when the output power is greatly increased, the voltage of the resonant point may not be clearly identified. Thus, the voltage decoding circuits 204, 304 cannot decode the voltage signal. In other words, even if the mobile device to be charged is placed at the correct position, the code decoded by the voltage decoding circuits 204, 304 still has error. Thus, the decoded code cannot pass the cycle redundancy check (CRC) or the parity check, and the mobile device may be forced to enter the off-line state.

However, in the present embodiment, the extra current decoding circuits 205, 305 are provided. When the load is heavy, the first feedback data FD1 decoded by the voltage decoding circuit 204 or 304 may be incorrect, such that the first feedback data FD1 cannot pass the error check of the control circuit 206 or 306. But the second feedback data FD2 would pass the error check of the control circuit 206 or 306. Therefore, the circuit for signal decoding in RFID or wireless power charging can prevent the disconnection between the charging system thereof and the outside mobile device when load is heavy. Also, the mobile device would not continuously and cyclically shows the charging state and the disconnecting state even when the mobile device to be charged is under low power state.

Similarly, when the load is light, the second feedback data FD2 decoded by the current decoding circuit 205 or 305 may be incorrect. When the second feedback data FD2 cannot pass the error check of the control circuit 206 or 306, the control circuit 206 or 306 would check the error check code of the first feedback data FD1. If the first feedback data FD1 pass the error check, the first feedback data FD1 would be adopted for controlling the output power such that the disconnection between the mobile device and the charging system can be prevented when the load is light.

Because the control circuit 206 or 306 can obtain the first feedback data FD1 and the second feedback data FD2, and check whether the first feedback data FD1 and the second feedback data FD2 pass the error check at the same time. If the first feedback data FD1 pass the error check and the second feedback data FD2 also pass the error check, the control circuit 206 or 306 can select one of the first feedback data FD1 and the second feedback data FD2 to be the reference for controlling the upper switch 201 or 301 and the lower switch 202 or 302.

Second Embodiment

Figure 4:
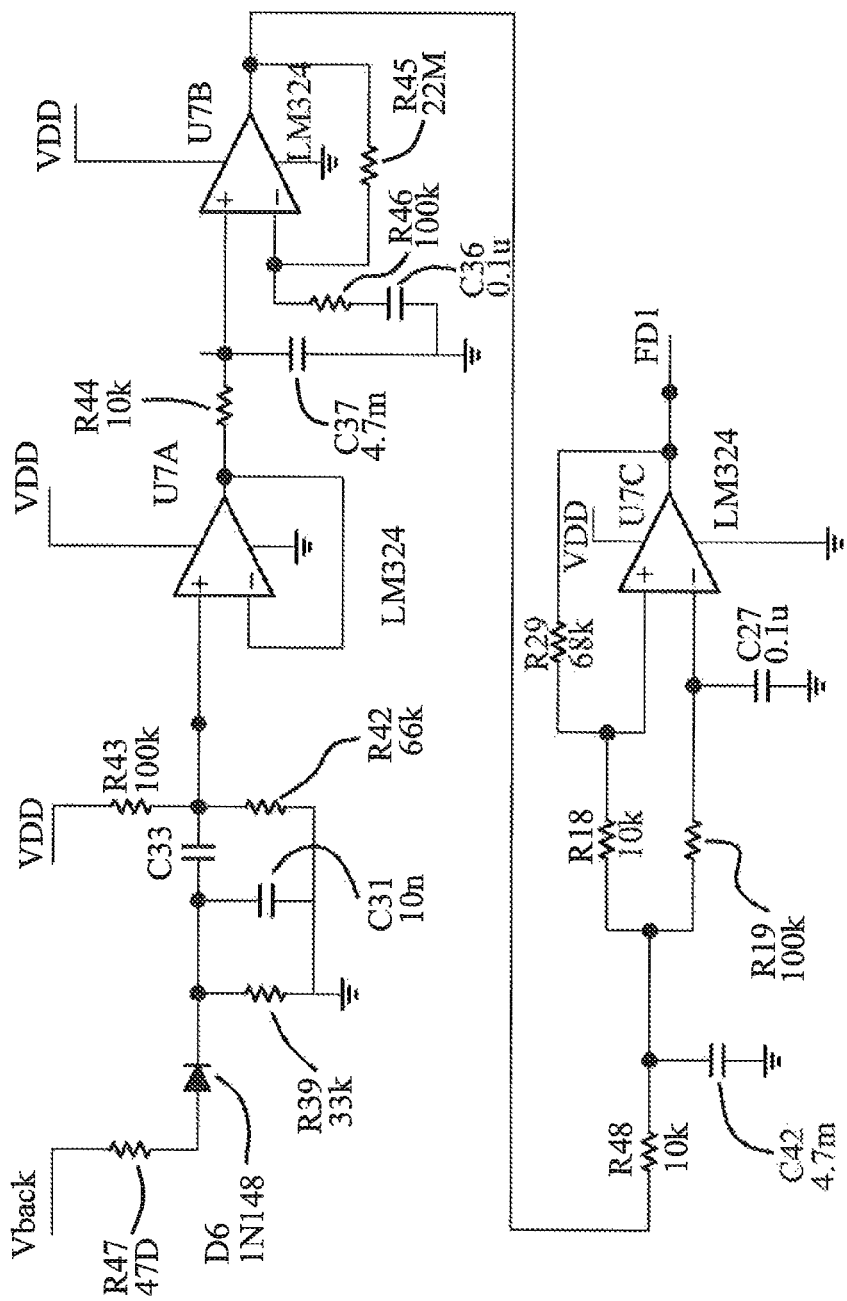
FIG. 4 illustrates a circuit diagram depicting a voltage decoding circuit in the circuit for signal decoding in RFID or wireless power charging according to a preferred embodiment of the present invention.

FIG. 4 illustrates a circuit diagram depicting a voltage decoding circuit in the circuit for signal decoding in RFID or wireless power charging according to a preferred embodiment of the present invention. Referring to FIG. 4, the voltage decoding circuit includes a peak detector including a diode D6, a resistor R39 and a capacitor C31, an isolation capacitor C33, a DC bias circuit implemented by a voltage divider R43 and R42, a buffer U7A implemented by a amplifier, a signal amplifier including the resistors R44, R45, R46, the capacitors C36, C37 and an amplifier U7B, a first filtering circuit including the resistor R48 and the capacitor C42, a second filtering circuit including the resistor R19 and the capacitor C27 and a Schmitt trigger implemented by the resistor R18, R29 and the amplifier U7C.

First, the voltage at the node Vback would pass the peak detector implemented by the diode D6, the resistor R39 and the capacitor C31 to obtain a peak signal. Since the peak signal has a DC component, and the DC component may not be adapted for the following amplifier, the peak signal has to pass the isolation capacitor C33 to filter the DC component of the peak signal. Next, the peak signal without the DC component would add a new DC component, which adapted for the following process, through the resistors R43 and R42. Afterward, the peak signal with new DC component would be amplified by an amplifier. After, the amplified signal thereof would initially pass a low pass filter with high cut-off frequency to filter its noise. Next, the filtered signal thereof would be inputted to the positive input terminal of the Schmitt trigger and the second filter. The second filter is mainly used for filtering the filtered signal to obtain a DC signal to output the DC signal to the negative terminal of the Schmitt trigger. The Schmitt trigger would output the first feedback data FD1. The control circuit 206 or 306 would check the CRC or parity of the first feedback data FD1 to determine whether the first feedback data FD1 is correct or not.

In accordance with the abovementioned circuit, the gain of the circuit is fixed. The swing of the input signal would affect the correctness of the first feedback data FD1. Assume that the circuit operates at heavy load, meanwhile, the swing or amplitude of the signal would excessively large. Thus, the signal amplifier implemented by the resistors R44, R45, R46, the capacitors C36, C37 and an amplifier U7B becomes saturation. It would cause that the decoded first feedback data FD1 is incorrect. Therefore, the following embodiment provides a current decoding circuit to prevent the disconnection of the mobile device caused by the decoding failure of the voltage decoding circuit.

Third Embodiment

Figure 5:
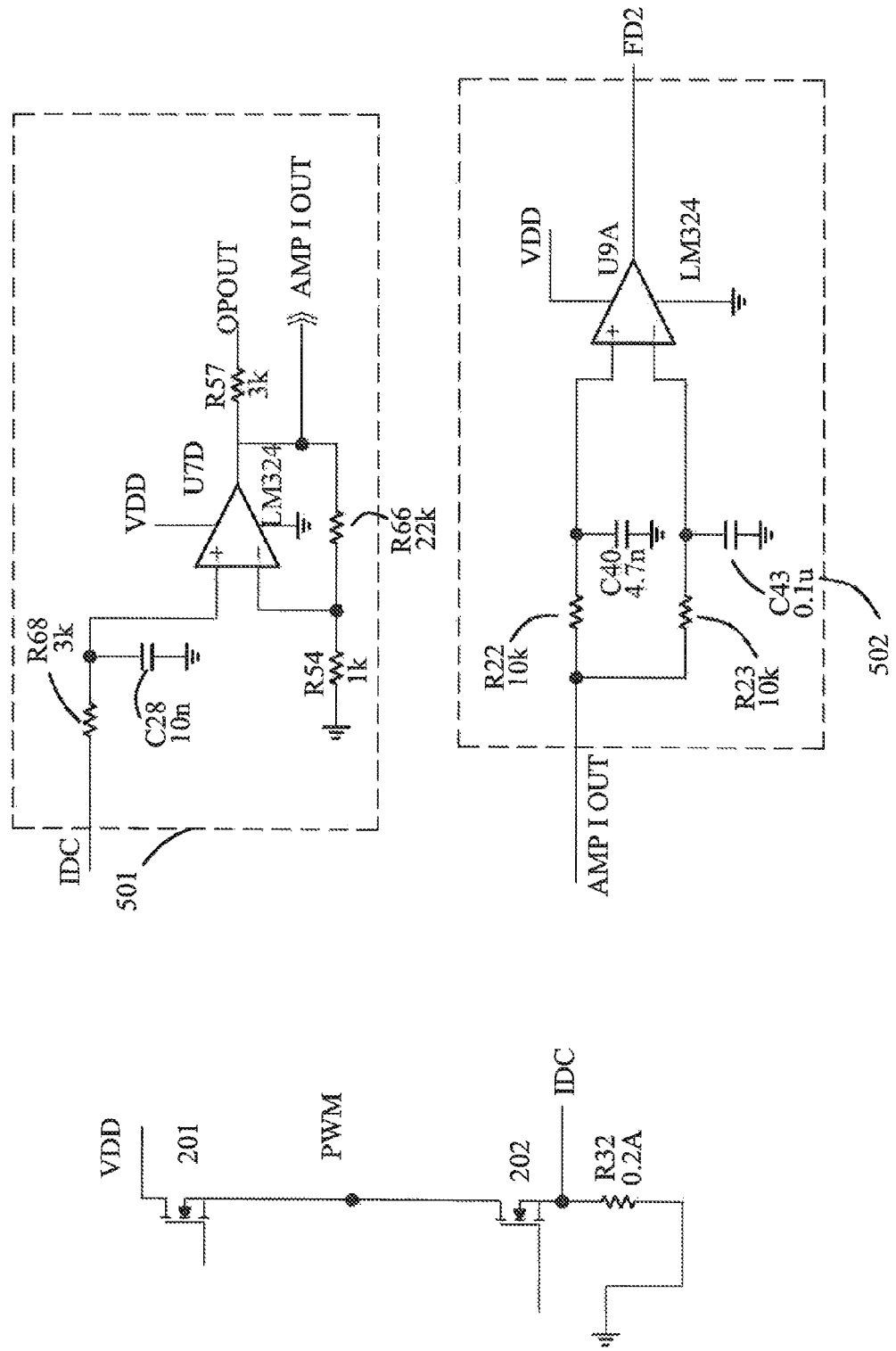
FIG. 5 illustrates a circuit diagram depicting a current decoding circuit in the circuit for signal decoding in RFID or wireless power charging according to a preferred embodiment of the present invention.

FIG. 5 illustrates a circuit diagram depicting a current decoding circuit in the circuit for signal decoding in RFID or wireless power charging according to a preferred embodiment of the present invention. Referring to FIG. 5, the current decoding circuit includes a current sensing resistor R32 coupled to the lower switch 202, a pre-amplifier implemented by the resistors R54, R66, R68, the capacitor C28 and the amplifier U7D and the strong current decoding circuit 502, wherein the strong current decoding circuit 502 includes a high cut-off frequency low pass filter (the resistor R22 and the capacitor C40), a low cut-off frequency low pass filter (the resistor R23 and the capacitor C43) and a comparator U9A.

The current flowing through the lower switch 202 is converted to a current sensing voltage IDC through the current sensing resistor R32. Afterward, the current sensing voltage IDC is initially amplified by the pre-amplifier. Next, the noise of the amplified signal thereof is filtered by the high cut-off frequency low pass filter (the resistor R22 and the capacitor C40) and the DC component of the amplified signal thereof is obtained by the low cut-off frequency low pass filter (the resistor R23 and the capacitor C43). Finally, the filtered amplified signal thereof and the DC component is compared to obtain the second feedback data FD2.

In heavy load, the frequency of the circuit operates near the resonant frequency. Hence, the gain thereof would be greatly increased. However, the swing of the current sensing voltage IDC is small. Thus, the current decoding circuit can compensate the failure of the decoding of the voltage decoding circuit to prevent the disconnection of the mobile device caused by the circuit's misjudgment.

Figure 6:
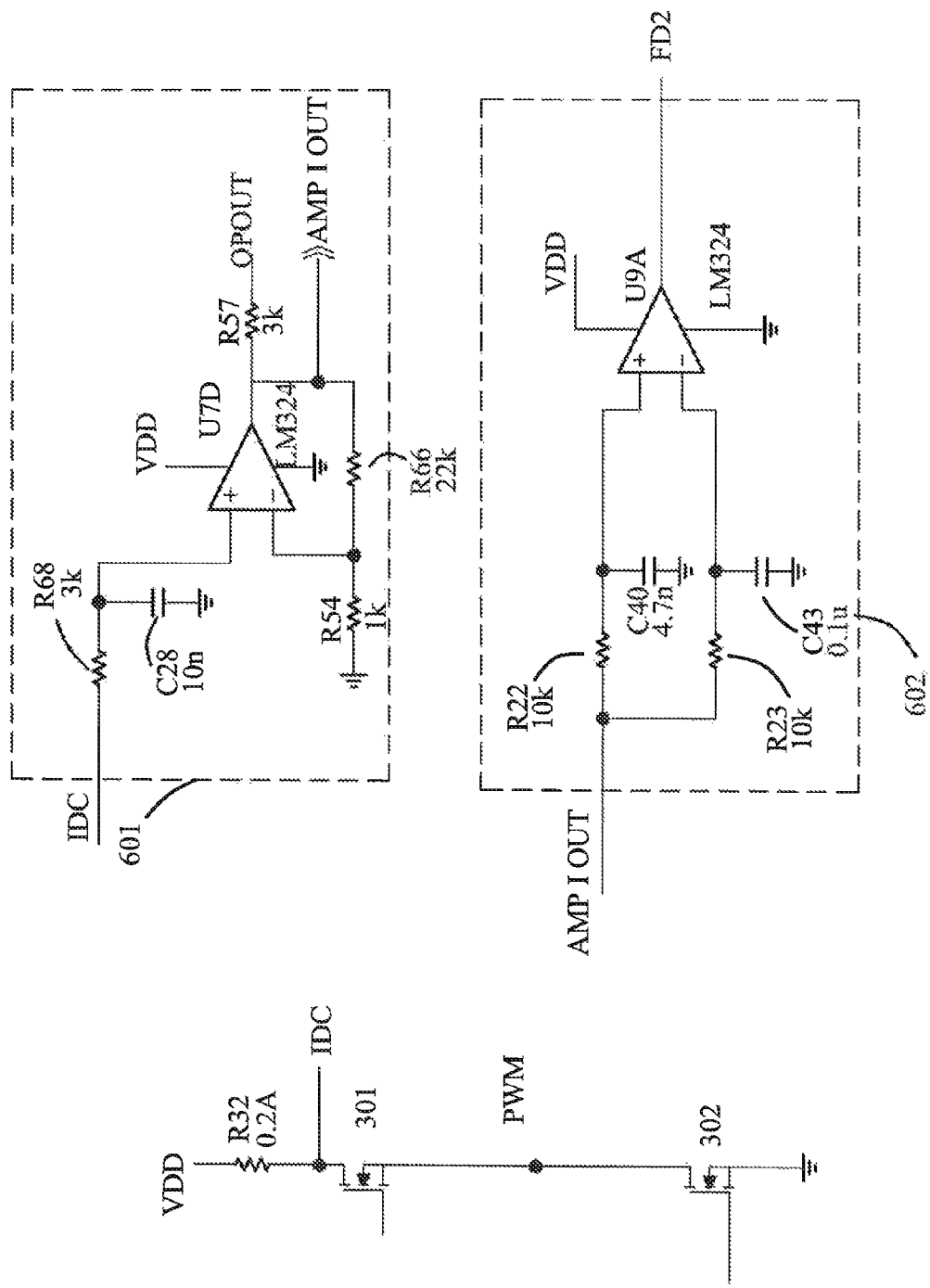
FIG. 6 illustrates a circuit diagram depicting a current decoding circuit in the circuit for signal decoding in RFID or wireless power charging according to a preferred embodiment of the present invention.

FIG. 6 illustrates a circuit diagram depicting a current decoding circuit in the circuit for signal decoding in RFID or wireless power charging according to a preferred embodiment of the present invention. Referring to FIG. 6, the current decoding circuit includes a current sensing resistor R32 coupled to the upper switch 301, a pre-amplifier implemented by the resistors R54, R66, R68, the capacitor C28 and the amplifier U7D and the strong current decoding circuit 602, wherein the strong current decoding circuit 602 includes a high cut-off frequency low pass filter (the resistor R22 and the capacitor C40), a low cut-off frequency low pass filter (the resistor R23 and the capacitor C43) and a comparator U9A.

Referring to FIG. 5 and FIG. 6, people having ordinary skill in the art should understand that the difference between the circuit in FIG. 5 and the circuit in FIG. 6 is the coupling relationship of the current sensing resistor R32. Because the concept of the circuit's operation in FIG. 6 is the same as the concept of the circuit's operation in FIG. 5, the detail description is omitted.

Fourth Embodiment

Figure 7:
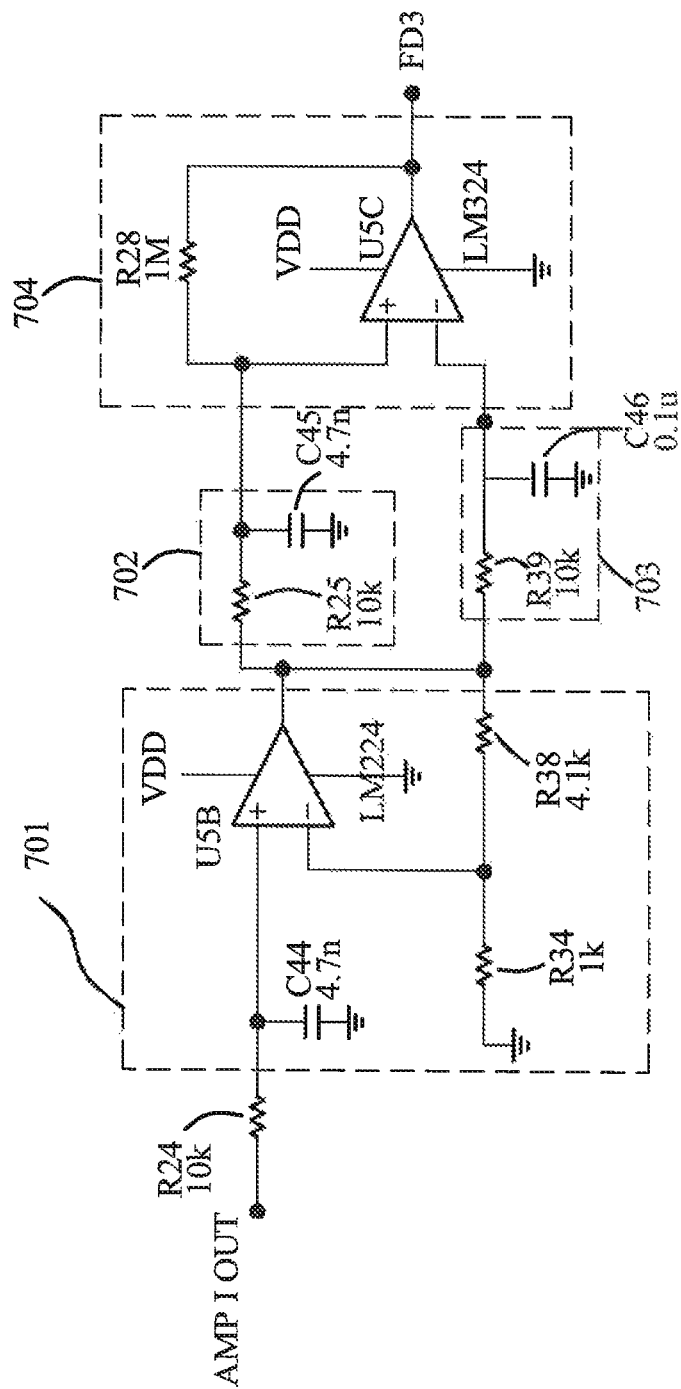
FIG. 7 illustrates a circuit diagram depicting a current decoding circuit in the circuit for signal decoding in RFID or wireless power charging according to a preferred embodiment of the present invention.

FIG. 7 illustrates a circuit diagram depicting a current decoding circuit in the circuit for signal decoding in RFID or wireless power charging according to a preferred embodiment of the present invention. Referring to FIG. 7, the circuit is coupled to the output terminal (AMP|OUT) of the pre-amplifier 501 in FIG. 5 or the output terminal (AMP|OUT) of the pre-amplifier 601 in FIG. 6. The current decoding circuit includes a second-stage amplifier 701, a third filter 702, a fourth filter 703 and a second comparator 704. Similarly, the swing/amplitude of the current sensing voltage IDC is small. In addition, the swing/amplitude of the current sensing voltage IDC would become smaller in light load. Hence, the current decoding circuit in FIG. 5 or FIG. 6 may not successfully decode the current sensing voltage IDC. In the present embodiment, the output signal of the pre-amplifier 501 or 601 would be amplified by the second-stage amplifier, and then, the noise of the output signal of the second-stage amplifier is filtered by the third filter 702, the DC component is obtained by the fourth filter 703, and the second comparator 704 compares the filtered output signal of the second-stage amplifier to the DC component to obtain a third feedback data FD3.

The control circuit 206 or 306 checks whether the first feedback data FD1, the second feedback data FD2 and the third feedback data FD3 are correct by their error check code. And also, the control circuit 206 or 306 acquires one of the first feedback data FD1, the second feedback data FD2 and the third feedback data FD3 which is passed the error check to be the reference for controlling the upper switch and the lower switch.

Fifth Embodiment

Figure 8:
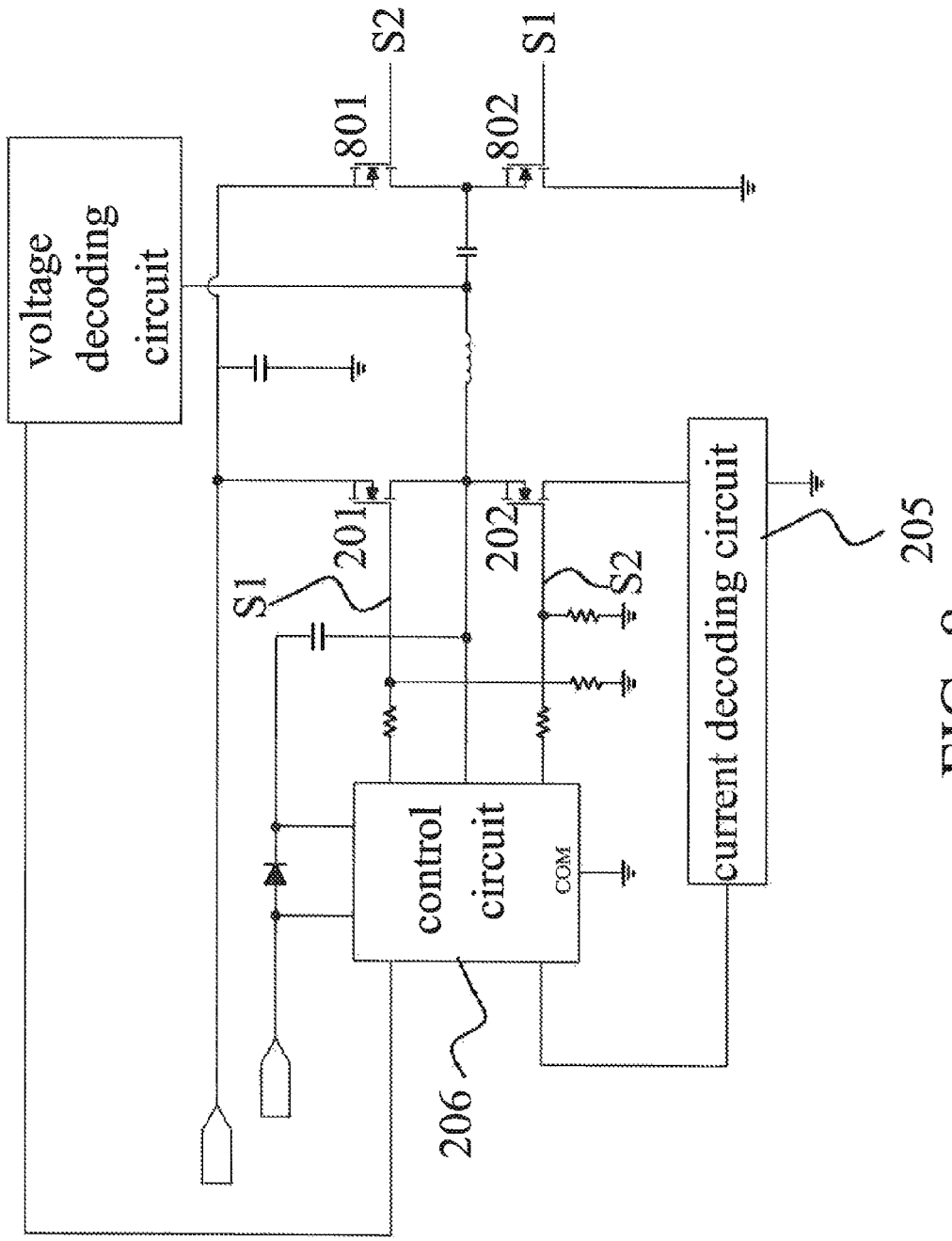
FIG. 8 illustrates a circuit block diagram depicting a circuit for signal decoding in RFID or wireless power charging according to a preferred embodiment of the present invention.

FIG. 8 illustrates a circuit block diagram depicting a circuit for signal decoding in RFID or wireless power charging according to a preferred embodiment of the present invention. Referring to FIG. 8 and FIG. 2, the difference between FIG. 8 and FIG. 2 is that the circuit in FIG. 2 uses half bridge topology and the circuit in FIG. 8 uses full bridge topology. The circuit in FIG. 8 has two extra electrical switches 801 and 802, wherein the gate terminal of the electrical switch 801 and the gate terminal of lower switch 202 receive the same control signal S2, and the gate terminal of electrical switch 802 and the gate terminal of the upper switch 201 receive the same control signal S1.

Figure 9:
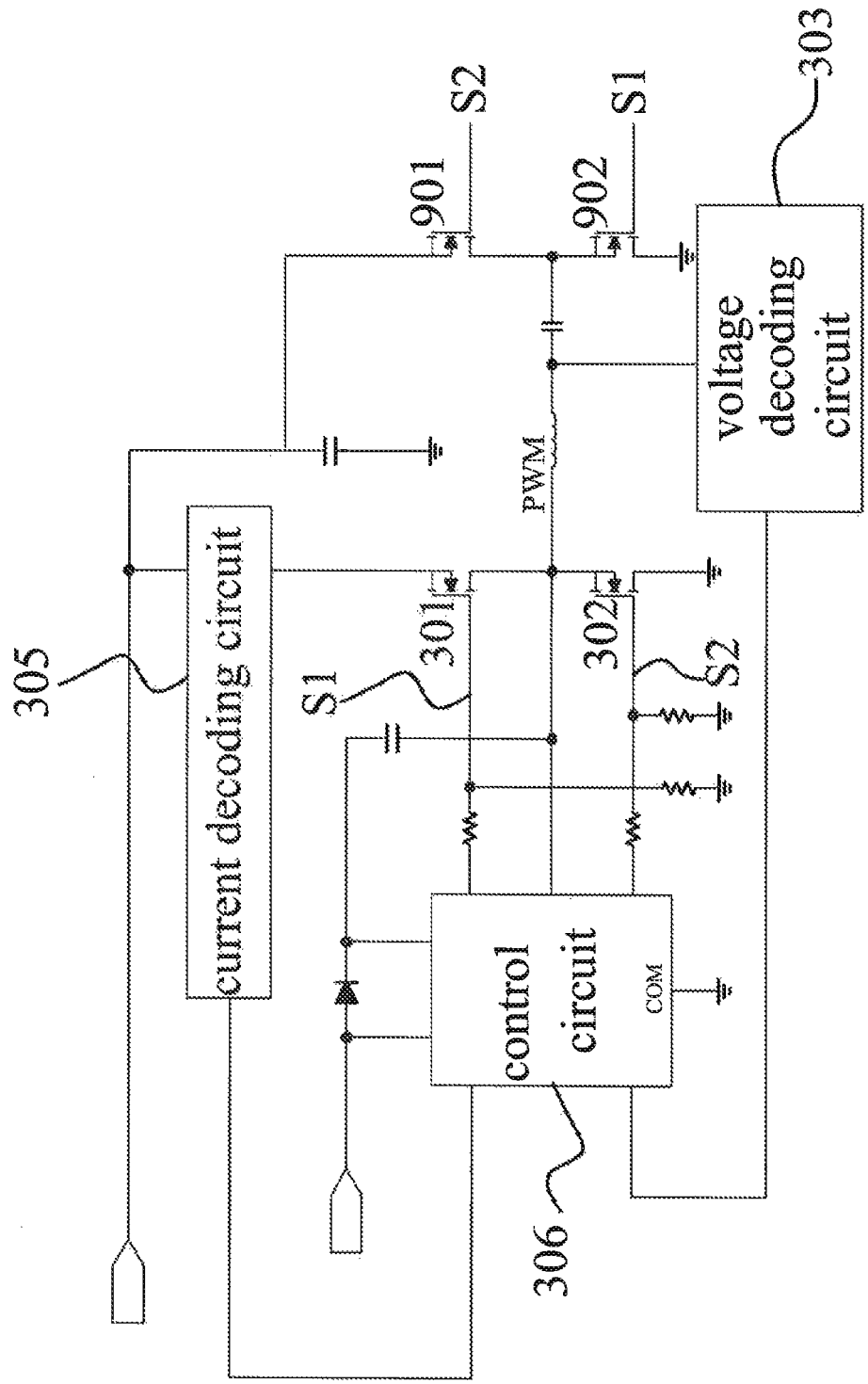
FIG. 9 illustrates a circuit block diagram depicting a circuit for signal decoding in RFID or wireless power charging according to a preferred embodiment of the present invention.

FIG. 9 illustrates a circuit block diagram depicting a circuit for signal decoding in RFID or wireless power charging according to a preferred embodiment of the present invention. Referring to FIG. 9 and FIG. 3, the difference between FIG. 9 and FIG. 3 is that the circuit in FIG. 3 uses half bridge topology and the circuit in FIG. 9 uses full bridge topology. The circuit in FIG. 9 has two extra electrical switches 901 and 902, wherein the gate terminal of the electrical switch 901 and the gate terminal of lower switch 302 receive the same control signal S2, and the gate terminal of electrical switch 902 and the gate terminal of the upper switch 301 receive the same control signal S1.

Because the operation of the abovementioned two circuits for signal decoding in RFID or wireless power charging implemented by full bridge topology is the same as that of the circuits in FIG. 2 and FIG. 3. The difference is only the control mode of the full bridge topology. Thus, the detail description is omitted.

In summary, the spirit of the present invention is to add a current decoding circuit connected to the upper switch or lower switch to decode the signal on the current sense resistor. Since the error would occur in the original voltage decoder of the wireless power or RFID when the load is heavy, the mobile device would sequentially shows "charging state", "offline state", "charging state", "offline state" . . . and so on when the mobile device is charging. Since the present invention uses the voltage and current for decoding at the same time, the decoding would be succeed whenever the load is light or heavy.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A circuit for signal decoding in RFID (radio frequency identification) or wireless power charging, comprising:

an upper switch, which comprises a first terminal, a second terminal and a control terminal, wherein the first terminal of the upper switch is coupled to a power voltage;

a lower switch, which comprises a first terminal, a second terminal and a control terminal, wherein the first terminal of the lower switch is coupled to the second terminal of the upper switch, and the second terminal of the lower switch is coupled to a common voltage;

an L-C (inductor and capacitor) resonant circuit, which comprises a first terminal, a second terminal and a resonant decoding terminal, wherein the first terminal of the L-C resonant circuit is coupled to the second terminal of the upper power switch and the first terminal of the lower power switch, and the second terminal of the L-C resonant circuit is coupled to the common voltage;

a voltage decoding circuit, which is coupled to the resonant decoding terminal of the L-C resonant circuit, for decoding a signal of the resonant decoding terminal to obtain a first feedback data according to a variation of an amplitude of the signal of the resonant decoding terminal;

a current decoding circuit, which is coupled between the second terminal of the lower switch and the common voltage, for decoding a current variation of the lower switch to obtain a second feedback data according to the current variation of the lower switch; and a control circuit, which is coupled to the control terminal of the upper switch, the control terminal of the lower switch, the voltage decoding circuit and the current decoding circuit, for decoding the first feedback data and the second feedback data to check whether a check code of the first feedback data is conformed to a specification and whether a check code of the second feedback data is conformed to the specification, wherein the control circuit acquires one of the first feedback data and the second feedback data which is conformed to the specification to serve as a reference for controlling the upper switch and the lower switch, wherein, when the load is heavy such that the first feedback data decoded by the voltage decoding circuit is incorrect, wherein the control circuit confirms that the check code of the first feedback data is incorrect, the control circuit confirms that the check code of the second feedback data is correct to prevent an electrical disconnection with an outside circuit, and wherein, when the load is light such that the second feedback data decoded by the current decoding circuit is incorrect, wherein the control circuit confirms that the check code of the second feedback data is incorrect, the control circuit confirms that the check code of the first feedback data is correct to prevent the electrical disconnection with the outside circuit.

2. The circuit for signal decoding in RFID or wireless power charging according to claim 1, wherein the L-C resonant circuit comprises:

a primary coil, comprising a first terminal and a second terminal, wherein the first terminal of the primary coil is coupled to the first terminal of the L-C resonant circuit; and a resonant capacitor, comprising a first terminal and a second terminal, wherein the first terminal of the resonant capacitor is coupled to the second terminal of the primary coil, and the second terminal of the resonant capacitor is coupled to the common voltage.

3. The circuit for signal decoding in RFID or wireless power charging according to claim 2, wherein the voltage decoding circuit comprises:

a peak detector, comprising an input terminal and an output terminal, wherein the input terminal of the peak detector is coupled to the second terminal of the primary coil;

an isolation capacitor, comprising a first terminal and a second terminal, wherein the first terminal of the isolation capacitor is coupled to the output terminal of the peak detector;

a DC (direct current) bias circuit, being coupled to the second terminal of the isolation circuit, for providing a DC bias to a signal of the second terminal of the isolation capacitor;

a buffer circuit, comprising an input terminal and an output terminal, wherein the input terminal of the buffer circuit is coupled to the second terminal of the isolation capacitor;

an amplifier, comprising an input terminal and an output terminal, wherein the input terminal of the amplifier is coupled to the output terminal of the buffer circuit, for amplifying a signal of the output terminal of the buffer circuit;

a first filter circuit, comprising an input terminal and an output terminal, wherein the input terminal of the first filter circuit is coupled to the output terminal of the amplifier;

a second filter circuit, comprising an input terminal and an output terminal, wherein the input terminal of the second filter circuit is coupled to the output terminal of the first filter circuit for filtering a signal of the output terminal of the first filter circuit to obtain a DC signal; and a comparator, comprising a first input terminal, a second input terminal and an output terminal, wherein the first input terminal of the comparator is coupled to the output terminal of the first filter circuit, the second input terminal of the comparator is coupled to the output terminal of the second filter circuit, and the output terminal of the comparator is coupled to the control circuit, wherein the comparator is used for comparing a signal outputted from the output terminal of the first filter circuit with the DC signal outputted from the output terminal of the second filter circuit, and output the first feedback data according to a difference between the signal outputted from the output terminal of the first filter circuit and the DC signal outputted from the output terminal of the second filter circuit.

4. The circuit for signal decoding in RFID or wireless power charging according to claim 3, wherein the peak detector comprises:

a diode, comprising an anode and a cathode, wherein the anode of the diode is coupled to the second terminal of the primary coil;

a capacitor, comprising a first terminal and a second terminal, wherein the first terminal of the capacitor is coupled to the cathode of the diode, the second terminal of the capacitor is coupled to the common voltage; and a resistor, comprising a first terminal and a second terminal, wherein the first terminal of the resistor is coupled to the first terminal of the capacitor and the second terminal of the resistor is coupled to the second terminal of the capacitor, wherein the first terminal of the resistor is the output terminal of the peak detector.

5. The circuit for signal decoding in RFID or wireless power charging according to claim 1, wherein the current decoding circuit comprises:

a current sensing resistor, comprising a first terminal and a second terminal, wherein the first terminal of the current sensing resistor is coupled to the second terminal of the lower switch, and the second terminal of the current sensing resistor is coupled to the common voltage; and a first stage amplifier, comprising an input terminal and an output terminal, wherein the input terminal of the first stage amplifier is coupled to the first terminal of the current sensing resistor for amplifying a current sensing signal of the first terminal of the current sensing resistor;

a strong current decoding circuit, comprising:

a first filter, comprising an input terminal and an output terminal, wherein the input terminal of the first filter is coupled to the output terminal of the first stage amplifier, for filtering a noise of a signal outputted from the output terminal of the first stage amplifier;

a second filter, comprising an input terminal and an output terminal, wherein the input terminal of the second filter is coupled to the output terminal of the first stage amplifier, for filtering the signal outputted from the output terminal of the first stage amplifier to output a first DC voltage; and a first comparator, comprising a first input terminal, a second input terminal and an output terminal, wherein the first input terminal of the first comparator is coupled to the output terminal of the first filter, the second input terminal of the first comparator is coupled to the output terminal of the second filter, and the output terminal of the first comparator outputs the second feedback data according to a comparison result between a signal inputted from the first input terminal of the first comparator and a signal inputted from the second input terminal of the first comparator.

6. The circuit for signal decoding in RFID or wireless power charging according to claim 5, wherein the current decoding circuit further comprises:

a weak current decoding circuit, comprising:

a second stage amplifier, comprising an input terminal and an output terminal, wherein the input terminal of the second stage amplifier is coupled to the output terminal of the first stage amplifier, for amplifying the signal outputted from the output terminal of the first stage amplifier;

a third filter, comprising an input terminal and an output terminal, wherein the input terminal of the third filter is coupled to the output terminal of the second stage amplifier, for filtering a noise of a signal outputted from the output terminal of the second stage amplifier;

a fourth filter, comprising an input terminal and an output terminal, wherein the input terminal of the fourth filter is coupled to the output terminal of the second stage amplifier, for filtering the signal outputted from the output terminal of the second stage amplifier to output a second DC voltage; and a second comparator, comprising a first input terminal, a second input terminal and an output terminal, wherein the first input terminal of the second comparator is coupled to the output terminal of the third filter, the second input terminal of the second comparator is coupled to the output terminal of the fourth comparator, and the output terminal of the second comparator outputs a third feedback data according to a comparison result between a signal inputted from the first input terminal of the second comparator and a signal inputted from the second input terminal of the second comparator, wherein the control circuit is coupled to the output terminal of the second comparator for checking whether a check code of the third feedback data is conformed to the specification, and the control circuit acquires one of the first feedback data, the second feedback data and the third feedback data which is conformed to the specification to serve as the reference for controlling the upper switch and the lower switch.

7. The circuit for signal decoding in RFID or wireless power charging according to claim 1, further comprising:

a second upper switch, comprising a first terminal, a second terminal and a control terminal, wherein the first terminal of the second upper switch is coupled to the power voltage, and the control terminal of the second upper switch is coupled to the control circuit;

a second lower switch, comprising a first terminal, a second terminal and a control terminal, wherein the first terminal of the lower switch is coupled to the second terminal of the second upper switch, the control terminal of the second lower switch is coupled to the control circuit, and the second terminal of the second lower switch is coupled to the common voltage;

wherein the second terminal of the L-C resonant circuit is coupled to the common voltage through the second lower switch, wherein the first terminal of the second lower switch is coupled to the second terminal of the L-C resonant circuit, wherein a received signal of the control terminal of the upper switch and a received signal of the control terminal of the second lower switch have a same phase, and a received signal of the control terminal of the lower switch and a received signal of the control terminal of the second upper switch have a same phase.

8. A circuit for signal decoding in RFID (radio frequency identification) or wireless power charging, comprising:

an upper switch, which comprises a first terminal, a second terminal and a control terminal, wherein the first terminal of the upper switch is coupled to a power voltage;

a lower switch, which comprises a first terminal, a second terminal and a control terminal, wherein the first terminal of the lower switch is coupled to the second terminal of the upper switch, and the second terminal of the lower switch is coupled to a common voltage;

an L-C (inductor and capacitor) resonant circuit, which comprises a first terminal, a second terminal and a resonant decoding terminal, wherein the first terminal of the L-C resonant circuit is coupled to the second terminal of the upper power switch and the first terminal of the lower power switch, and the second terminal of the L-C resonant circuit is coupled to the common voltage;

a voltage decoding circuit, which is coupled to the resonant decoding terminal of the L-C resonant circuit, for decoding a signal of the resonant decoding terminal to obtain a first feedback data according to a variation of an amplitude of the signal of the resonant decoding terminal;

a current decoding circuit, which is coupled between the first terminal of the upper switch and the power voltage, for decoding a current variation of the upper switch to obtain a second feedback data according to the current variation of the upper switch; and a control circuit, which is coupled to the control terminal of the upper switch, the control terminal of the lower switch, the voltage decoding circuit and the current decoding circuit, for decoding the first feedback data and the second feedback data to check whether a check code of the first feedback data is conformed to a specification and whether a check code of the second feedback data is conformed to the specification, wherein the control circuit acquires one of the first feedback data and the second feedback data which is conformed to the specification to serve as a reference for controlling the upper switch and the lower switch, wherein, when the load is heavy such that the first feedback data decoded by the voltage decoding circuit is incorrect, wherein the control circuit confirms that the check code of the first feedback data is incorrect, the control circuit confirms that the check code of the second feedback data is correct to prevent an electrical disconnection with an outside circuit, and wherein, when the load is light such that the second feedback data decoded by the current decoding circuit is incorrect, wherein the control circuit confirms that the check code of the second feedback data is incorrect, the control circuit confirms that the check code of the first feedback data is correct to prevent the electrical disconnection with the outside circuit.

9. The circuit for signal decoding in RFID or wireless power charging according to claim 8, wherein the L-C resonant circuit comprises:

a primary coil, comprising a first terminal and a second terminal, wherein the first terminal of the primary coil is coupled to the first terminal of the L-C resonant circuit; and a resonant capacitor, comprising a first terminal and a second terminal, wherein the first terminal of the resonant capacitor is coupled to the second terminal of the primary coil, and the second terminal of the resonant capacitor is coupled to the common voltage.

10. The circuit for signal decoding in RFID or wireless power charging according to claim 9, wherein the voltage decoding circuit comprises:

a peak detector, comprising an input terminal and an output terminal, wherein the input terminal of the peak detector is coupled to the second terminal of the primary coil;

an isolation capacitor, comprising a first terminal and a second terminal, wherein the first terminal of the isolation capacitor is coupled to the output terminal of the peak detector;

a DC (direct current) bias circuit, being coupled to the second terminal of the isolation circuit, for providing a DC bias to a signal of the second terminal of the isolation capacitor;

a buffer circuit, comprising an input terminal and an output terminal, wherein the input terminal of the buffer circuit is coupled to the second terminal of the isolation capacitor;

an amplifier, comprising an input terminal and an output terminal, wherein the input terminal of the amplifier is coupled to the output terminal of the buffer circuit, for amplifying a signal of the output terminal of the buffer circuit;

a first filter circuit, comprising an input terminal and an output terminal, wherein the input terminal of the first filter circuit is coupled to the output terminal of the amplifier;

a second filter circuit, comprising an input terminal and an output terminal, wherein the input terminal of the second filter circuit is coupled to the output terminal of the first filter circuit for filtering a signal of the output terminal of the first filter circuit to obtain a DC signal; and a comparator, comprising a first input terminal, a second input terminal and an output terminal, wherein the first input terminal of the comparator is coupled to the output terminal of the first filter circuit, the second input terminal of the comparator is coupled to the output terminal of the second filter circuit, and the output terminal of the comparator is coupled to the control circuit, wherein the comparator is used for comparing a signal outputted from the output terminal of the first filter circuit with the DC signal outputted from the output terminal of the second filter circuit, and output the first feedback data according to a difference between the signal outputted from the output terminal of the first filter circuit and the DC signal outputted from the output terminal of the second filter circuit.

11. The circuit for signal decoding in RFID or wireless power charging according to claim 10, wherein the peak detector comprises:

a diode, comprising an anode and a cathode, wherein the anode of the diode is coupled to the second terminal of the primary coil;

a capacitor, comprising a first terminal and a second terminal, wherein the first terminal of the capacitor is coupled to the cathode of the diode, the second terminal of the capacitor is coupled to the common voltage; and a resistor, comprising a first terminal and a second terminal, wherein the first terminal of the resistor is coupled to the first terminal of the capacitor and the second terminal of the resistor is coupled to the second terminal of the capacitor, wherein the first terminal of the resistor is the output terminal of the peak detector.

12. The circuit for signal decoding in RFID or wireless power charging according to claim 8, wherein the current decoding circuit comprises:

a current sensing resistor, comprising a first terminal and a second terminal, wherein the first terminal of the current sensing resistor is coupled to the first terminal of the upper switch, and the second terminal of the current sensing resistor is coupled to the power voltage; and a first stage amplifier, comprising an input terminal and an output terminal, wherein the input terminal of the first stage amplifier is coupled to the first terminal of the current sensing resistor for amplifying a current sensing signal of the first terminal of the current sensing resistor;

a strong current decoding circuit, comprising:

a first filter, comprising an input terminal and an output terminal, wherein the input terminal of the first filter is coupled to the output terminal of the first stage amplifier, for filtering a noise of a signal outputted from the output terminal of the first stage amplifier;

a second filter, comprising an input terminal and an output terminal, wherein the input terminal of the second filter is coupled to the output terminal of the first stage amplifier, for filtering the signal outputted from the output terminal of the first stage amplifier to output a first DC voltage; and a first comparator, comprising a first input terminal, a second input terminal and an output terminal, wherein the first input terminal of the first comparator is coupled to the output terminal of the first filter, the second input terminal of the first comparator is coupled to the output terminal of the second filter, and the output terminal of the first comparator outputs the second feedback data according to a comparison result between a signal inputted from the first input terminal of the first comparator and a signal inputted from the second input terminal of the first comparator.

13. The circuit for signal decoding in RFID or wireless power charging according to claim 12, wherein the current decoding circuit further comprises:

a weak current decoding circuit, comprising:

a second stage amplifier, comprising an input terminal and an output terminal, wherein the input terminal of the second stage amplifier is coupled to the output terminal of the first stage amplifier, for amplifying the signal outputted from the output terminal of the first stage amplifier;

a third filter, comprising an input terminal and an output terminal, wherein the input terminal of the third filter is coupled to the output terminal of the second stage amplifier, for filtering a noise of a signal outputted from the output terminal of the second stage amplifier;

a fourth filter, comprising an input terminal and an output terminal, wherein the input terminal of the fourth filter is coupled to the output terminal of the second stage amplifier, for filtering the signal outputted from the output terminal of the second stage amplifier to output a second DC voltage; and a second comparator, comprising a first input terminal, a second input terminal and an output terminal, wherein the first input terminal of the second comparator is coupled to the output terminal of the third filter, the second input terminal of the second comparator is coupled to the output terminal of the fourth comparator, and the output terminal of the second comparator outputs a third feedback data according to a comparison result between a signal inputted from the first input terminal of the second comparator and a signal inputted from the second input terminal of the second comparator, wherein the control circuit is coupled to the output terminal of the second comparator for checking whether a check code of the third feedback data is conformed to the specification, and the control circuit acquires one of the first feedback data, the second feedback data and the third feedback data which is conformed to the specification to serve as the reference for controlling the upper switch and the lower switch.

14. The circuit for signal decoding in RFID or wireless power charging according to claim 8, further comprising:
a second upper switch, comprising a first terminal, a second terminal and a control terminal, wherein the first terminal of the second upper switch is coupled to the power voltage, and the control terminal of the second upper switch is coupled to the control circuit;
a second lower switch, comprising a first terminal, a second terminal and a control terminal, wherein the first terminal of the lower switch is coupled to the second terminal of the second upper switch, the control terminal of the second lower switch is coupled to the control circuit, and the second terminal of the second lower switch is coupled to the common voltage;
wherein the second terminal of the L-C resonant circuit is coupled to the common voltage through the second lower switch, wherein the first terminal of the second lower switch is coupled to the second terminal of the L-C resonant circuit, and
wherein a received signal of the control terminal of the upper switch and a received signal of the control terminal of the second lower switch have a same phase, and a received signal of the control terminal of the lower switch and a received signal of the control terminal of the second upper switch have a same phase.

* * * * *